(No Model.)
T. BARNES.
OPEN LINK.
No. 324,637. Patented Aug. 18, 1885.
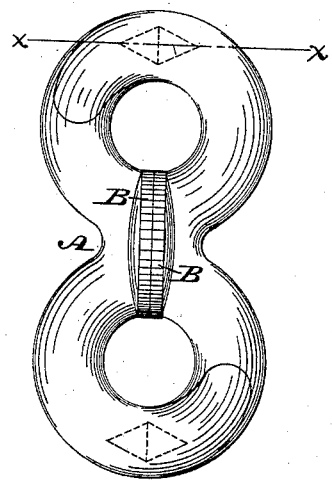
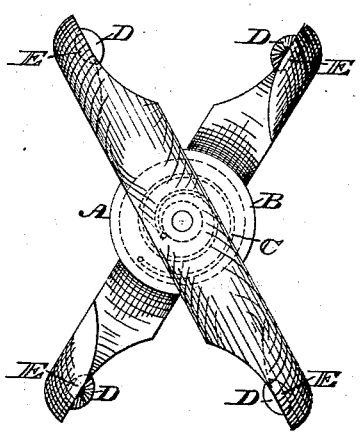
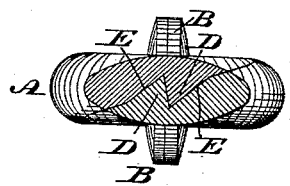
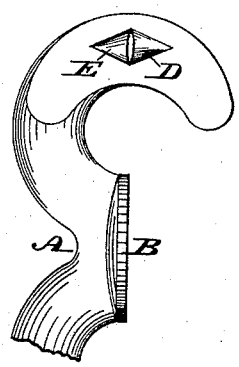

UNITED STATES PATENT OFFICE

THOMAS BARNES, OF PHILADELPHIA, PENNSYLVANIA.

OPEN LINK.

SPECIFICATION forming part of Letters Patent No. 324,637, dated August 18, 1885.

Application filed June 3, 1885. (No model.)

*To all whom it may concern:*

Be it known that I, THOMAS BARNES, a citizen of the United States, residing in the city and county of Philadelphia, State of Pennsylvania, have invented a new and useful Improvement in Open Links, which improvement is fully set forth in the following specification and accompanying drawings, in which—

Figure 1 represents a side elevation of an open link embodying my invention, the link being closed. Fig. 2 represents a side elevation thereof at a right angle to Fig. 1, the link being open. Fig. 3 represents a section thereof in line $x\ x$, Fig. 1. Fig. 4 represents a view of a portion of the inner face of one of the sections of the link.

Similar letters of reference indicate corresponding parts in the several figures.

My invention consists of an open link formed of two similar sections centrally pivoted together on the same axis, the said axis and the ends of the link being in the same plane, each section having on its inner face a lug and a recess, so that when the sections are closed the lugs enter the opposite recesses and abut against each other in such manner as to prevent any lateral displacement of the sections and receive any lateral strain that may be imparted to the ends of the link.

Referring to the drawings, A represents an open link, which, when closed, may be said to form the figure 8, consisting of two sections, each substantially of the form of the figure 3, so arranged that the curved ends of the sections are contiguous and lap each other, the said curved ends and the side parts of the sections being in the same plane. The sections are pivoted to each other centrally, whereby they may be opened, as shown in Fig. 2, and closed, as in Fig. 1, and each of the contiguous faces of the centers of each section has a bearing, B, whereby said sections may readily rotate on each other, said bearings being recessed to receive a coiled spring, C, (shown in dotted lines,) one end of which is connected with one section and the other end with the opposite section, the effect of said spring being to close the sections and hold the ends thereof in contact.

On the inner faces of the ends of each section is a lug, D, and aside thereof is a recess, E, it being noticed that the said lugs and recesses are so disposed that when the link is closed the lugs of one section enter the recesses of the other section. The link may be opened readily by turning either section or both sections on the pivot or axis thereof, and when it is closed the lugs of the two sections at each end of the link abut without in any way interfering with the proper closing of the link. By this provision, should there be any lateral strain on the link, the same is transmitted to the lugs, which, as will be seen more particularly in Fig. 3, are formed solidly on the inner faces of the sections and embedded therein, and serve to strengthen the link and relieve the axis or pivot of the sections of said lateral strain.

When the link is in use, the spring C prevents accidental separation of the sections and obviates the tendency of the sections to rattle.

Having thus described my invention, what I claim as new, and desire to secure by Letters Patent, is—

1. A link formed of sections shaped substantially as described, having central pivoted bearings, the latter being recessed and containing a spring, the ends of which are connected with the two sections, substantially as described.

2. An open link consisting of sections shaped substantially as described, centrally pivoted together, having their bearings recessed, with a spring therein, and lugs and recesses on the inner faces of the sections abutting against each other when the link is closed, substantially as described.

3. An open link formed of two sections having a central bearing, B, each section having at each end thereof the projection D and recess E, adapted to interlock when the link is closed, substantially as described.

THOMAS BARNES.

Witnesses:
  JOHN A. WIEDERSHEIM,
  A. P. GRANT.